Sept. 10, 1957        E. M. ALLEN        2,806,012
VULCANIZED RUBBER-SILICA COMPOSITION
Original Filed April 22, 1952
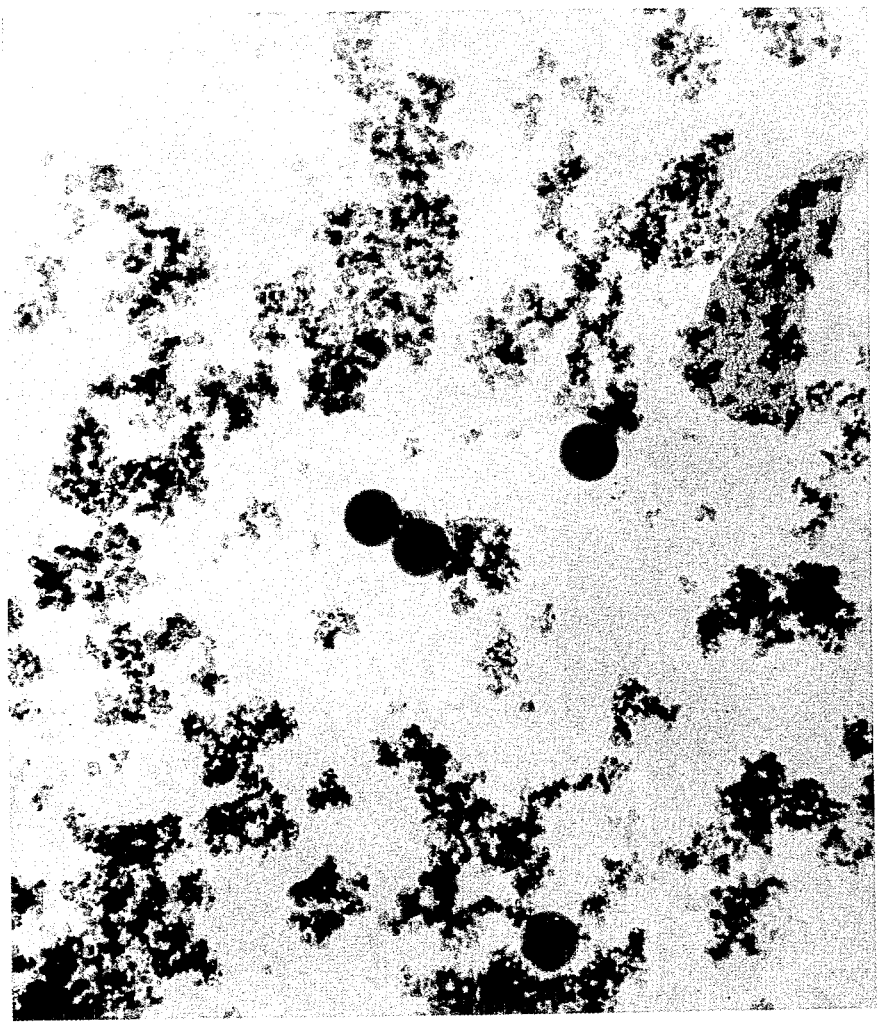
INVENTOR.
EDWARD M. ALLEN
BY Oscar L. Spencer
ATTORNEY United States Patent Office 2,806,012
Patented Sept. 10, 1957

2,806,012

VULCANIZED RUBBER-SILICA COMPOSITION

Edward M. Allen, Doylestown, Ohio, assignor to Columbia-Southern Chemical Corporation, Allegheny County, Pa., a corporation of Delaware Original application April 22, 1952, Serial No. 283,721. Divided and this application March 28, 1957, Serial No. 649,133

6 Claims. (Cl. 260—41.5)

This invention relates to a novel rubber composition comprising a vulcanized mixture of rubber (including synthetic rubber) and a precipitated siliceous pigment which has unusual strength properties.

Silica prepared by precipitation from aqueous solutions of alkali metal silicate has not heretofore been used successfully on a commercial scale as a rubber reinforcing pigment. While certain relatively coarse silica powders and certain silica gels have been proposed for use in rubber, they have served primarily as fillers or diluents rather than as effective reinforcing pigments.

According to the present invention, vulcanized silica-rubber compositions having good strength properties have been prepared. When GR-S rubber has been used as the rubber component, vulcanized rubber products having tensile strengths above 2400 pounds per square inch have been produced. Natural rubber products of even higher strength can be produced due to the inherent high strength of natural rubber. When this silica is prepared by mixing the precipitated silica before drying with rubber latex and coagulating the mixture, the strength properties of the product obtained are at an optimum. However, good rubber can be produced in which the silica is well dispersed, and which is free from "pinholes" or white specks, by drying the silica herein contemplated and then milling the dried product into the rubber.

The novel composition herein contemplated is a vulcanized mixture of rubber and a finely divided, precipitated silica in the form of porous flocs, the silica containing in excess of 90 percent, preferably 94 percent or more, by weight of $SiO_2$, measured on the anhydrous basis (that is, on a basis excluding bound and free water), bound water in the proportion of about 3 to 9 moles (normally about 6 moles) of $SiO_2$ per mole of bound water, and from 2 to 10 percent of free water by weight of the pigment, and which has a surface area of about 60 to 200 square meters per gram, preferably in the range of 75 to 175 square meters per gram, and an average ultimate particle size in the range of 0.015 to 0.05 micron. Preferably, this pigment also should contain no more than 1.75 percent, generally less than 1 percent, by weight of $Na_2O$, and may even be free of $Na_2O$. The surface area of the pigment may be measured by the Brunauer-Emmett-Teller method which is described in Journal American Chemical Society, vol. 60, page 309 (1938).

An especially valuable pigment of the type described above is one which contains a small amount of a metal of the group consisting of alkaline earth metals, such as calcium, magnesium, barium or strontium, and zinc. Very superior pigments have been prepared according to this invention which contain one mole of the metal oxide or oxides per 10 to 150 moles of $SiO_2$. This metal is present as the metal oxide, possibly in chemical association with this silica, and its percentage concentration normally ranges from 0.5 to 6 percent, computed as the metal oxide, based upon the weight of the entire pigment.

The presence of the water and a metal, such as calcium, in the pigment appears to impart especially advantageous properties. The herein described silica has been determined to be safe from a health standpoint. This is understood to be due, among other factors, to the presence of these agents.

The above described silica compositions are useful reinforcing pigments in various rubber compositions, including natural rubber, and synthetic rubber compositions, including butadiene-1,3-styrene copolymers, butadiene-acrylonitrile copolymers, butadiene-isobutylene copolymers (butyl rubber), and like synthetic elastomers which are derived from polymerization of butadiene-1,3, 2-chlorobutadiene, isoprene, ethylene or the like, alone or with other polymerizable materials, including styrene, methyl methacrylate, methyl chloroacrylate, acrylonitrile, vinyl chloride, and their equivalents.

Approximately 5 to 100 parts by weight of silica is incorporated per 100 parts by weight of the rubber. Best results are obtained when 40 to 80 parts by weight of the silica is used per 100 parts of rubber. The rubber composition contains other conventional components, such as accelerators and modifying agents, such as listed in some of the ensuing examples. Temperatures of cure and methods of vulcanizing or milling these compositions are conventional and well understood in the art.

The problem of preparing a precipitated pigment of the type herein contemplated is quite difficult. It is believed that none of the processes which are disclosed by the prior art produce a pigment of the type which has been provided according to the present invention.

The various factors which have been set forth above appear to be of considerable importance in the provision of a pigment which will effectively reinforce rubber, including synthetic rubbers. The silica concentration of the pigment should be high and should exceed 90 percent by weight, frequently being as high as 94 percent by weight or even higher, on the anhydrous basis.

As previously explained, the silica pigment used according to this invention appears under high magnification to be in the form of flocs or aggregates of individual particles. These flocs are porous and resemble upon magnification a bunch of grapes. The average ultimate particle size of the silica is estimated by comparison to be about 0.02 to 0.03 micron.

Two types of water are present in my novel pigment. These types are termed "bound water" and "free water." The term "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from a silica pigment by heating the pigment at ignition temperature, for example, 1000 to 1200° C., until no further water can be removed, minus the amount of free water in the pigment.

It has been found, according to the present invention, that the presence of free water is advantageous. That is, pigments which do not contain free water produce rubber compositions which cure relatively slowly unless special additives, such as ethylene glycol, are introduced into the composition.

It will be understood that the amount of water remaining in a precipitated pigment depends upon the time, temperature, and other conditions of drying. Thus, it is not possible to express the conditions which will be required for drying a particular pigment with any degree of exactness. This, of course, will vary to a large degree depending upon the degree of air circulating through the pigment, the type of drying apparatus, and the like. There appears to be a material difference in the manner in which free water and bound water are held in the molecule. The bound water appears to be chemically combined with the silica particle. For this reason, the bound water does not come off readily unless dried at temperatures above 350° C. On the other hand, the free water comes off readily upon drying at normal temperatures. Some portion of this water will be picked up on standing in atmospheric air of normal humidification. When bound water is removed, only a small portion thereof is reabsorbed on standing.

The pigments herein contemplated may be prepared by a large number of methods. A particularly effective method of preparing the silica pigment herein contemplated involves reaction of finely divided alkaline earth metal silicate, such as calcium silicate having an average ultimate particle size below 0.1 micron, with an acid having an anion which forms a water soluble salt with the alkaline earth metal.

In the practice of this process, the acid is reacted with the calcium silicate in an aqueous medium, and sufficient acid is added to largely decompose the calcium silicate, to extract the calcium therefrom, and to prevent establishment of a concentration of calcium in the silica above about 6 percent by weight of the silica pigment, computed as CaO. Consequently, sufficient acid normally is used to reduce the pH below about 5, usually in the range of 3 to 5. During the acidification, the slurry of calcium silicate may be agitated in order to promote and facilitate reaction. In order to avoid use of excess acid, acid is added in small portions until the desired pH has been reached, as indicated for example by suitable indicators, such as methyl orange. In general, additions of large excesses of acid beyond a pH of 0, for example, are unnecessary. After the reaction of calcium silicate with acid has been completed and the pH of the aqueous slurry has been reduced below about 4 or 5, the precipitated silica is recovered.

This silica, of course, is present in an aqueous slurry. Serious problems arise in the recovery of the silica from the slurry by virtue of the fact that the silica fails to settle rapidly and also filters with extreme slowness. What is even more important, the finely divided pigment thus obtained normally has a surface area well above 200 square meters per gram.

According to this invention, it has been found that these difficulties may be avoided by readjusting the pH of the slurry above 5, generally in the range of 5 to 9. This adjustment is advantageous in order to facilitate separation of the silica from the aqueous medium. It is also advantageous since it has a material effect upon the surface area of the pigment produced and thereby insures that this pigment will have the surface area desired.

While more rapid filtration is achieved when the pH of the silica is 7 or above, pigments having an acid pH disperse better in rubber. For this reason, it is advantageous for the silica to be slightly acidic. On the other hand, the pH of the slurry should be maintained above about 5 to facilitate filtration. Best pigment is achieved when the slurry is adjusted to above about 5 and below 7. In such a case, the pH of the pigment is about 6 to 8.5. While addition of excess acid followed by readjustment is found preferable, it is also possible to add the acid directly to the slurry until the desired pH range is achieved without readjustment.

Following this, the pigment is recovered by settling and/or filtration. Thereafter, the pigment is dried.

In general, alkali is added to the precipitated silica before the silica is completely separated from its mother liquor which contains dissolved calcium chloride or like calcium salt. Thus, the process normally is conducted by adding acid to a slurry or suspension of the calcium silicate until the pH thereof is reduced to 5 or below and, thereafter, alkali such as sodium hydroxide or like alkali metal hydroxide is added to the resulting slurry. As a consequence, the silica contains an appreciable amount, usually 1 to 5 percent by weight, of CaO. After the adjustment of the slurry is effected, the silica is recovered.

In drying the pigment, care is exerted to avoid dehydration of the pigment to the point where all of the free water, as herein defined, is removed. Hence, the drying operation normally is discontinued while a substantial quantity of free water remains. The preferred ranges are as specified above. To effect this result, the temperature of drying should be neither too high nor too low. Furthermore, drying should not be continued over an excessively long period. In general, the temperature of drying will range between 100–200° C., usually in the range of about 120–140° C. The time of drying, of course, will depend upon the amount of water entrapped in the pigment and the amount of air circulating through or over the pigment. Periods of time ranging from 10 to 12 hours normally are satisfactory when the drying temperature is within the range of 120–140° C. and the drying is conducted in a stationary shelf dryer or air-circulating oven. Shorter or longer times may be necessary if the temperature of heating becomes higher or lower or if other drying equipment is used.

For special purposes as, for example, in silica grease or in silicone rubber or the like, it is advantageous to use a silica having a pH of 2 to 3.5. Such a product is difficult to filter and requires special equipment to resist corrosion. In such a case, recovery of the silica from the slurry by spray drying is advantageous.

In order to obtain a product which has maximum pigmentary reinforcing characteristics when used in rubber compositions, it is necessary to use a special form of calcium silicate or similar alkaline earth metal silicate. That is, some calcium silicates will not produce the results desired. In general, in order to obtain a proper pigment of the desired particle size from calcium silicate, it is necessary to use a precipitated calcium silicate having a surface area of 50 to 125 square meters per gram and an average ultimate particle size below 0.1 micron, usually 0.02 to 0.06 micron.

The manner in which the calcium silicate has been prepared has a definite influence upon the character of the silica which is obtained therefrom. Thus, is has been found that tensile tests of rubber compositions containing silica obtained from calcium silicate prepared by reaction of calcium acetate with sodium silicate were lower than those prepared as hereinafter described, either because they cured with extreme slowness or for other reasons.

The best silica which has been prepared from calcium silicate has been obtained when the calcium silicate has been prepared by reacting calcium chloride with alkali metal silicate in aqueous medium containing sodium chloride or like alkali metal chloride. This sodium chloride conveniently may be in the calcium chloride solution although it may also be in the sodium silicate solution. Thus, it is found most desirable to react aqueous sodium silicate with an aqueous calcium chloride solution containing sodium chloride preferably in the proportion of at least 0.1 pound, and usually in the range of 0.2 to 0.5 pound, of sodium chloride per pound of calcium chloride. Normally, the NaCl content of the solution should be in excess of 2 to 5 grams per liter. Solutions which contain higher sodium chloride content may be used. However, it is rare that the weight of sodium chloride will exceed the weight of calcium chloride in the solution or will be present in excess of 100 grams per liter in either solution. The presence of the sodium chloride materially improves the character of the pigment.

The concentrations of the calcium chloride solution and the alkali metal silicate solution also have a bearing upon the final product. Thus, using a solution in which the sodium chloride content was 0.3 to 0.4 pound per pound of calcium chloride, pigments of inferior quality were obtained when the calcium chloride concentration was 5 or 10 grams per liter. Best pigments were obtained in such a case when the calcium chloride solution contained at least 20 grams per liter, usually in the range of 50 to 150 grams per liter, and using sodium silicate solution containing in excess of 20 grams of $SiO_2$ per liter, usually in the range of 50 to 150 grams per liter of $SiO_2$. More concentrated solutions containing up to about 200 grams per liter of $CaCl_2$ and of $SiO_2$ or even higher may be used, although best results have been obtained when the concentration of the $CaCl_2$ and $SiO_2$ solutions is below 200 grams per liter.

The proportion of calcium chloride solution to sodium silicate normally is sufficient to react with all or at least most of the sodium silicate. In general, the amount of calcium chloride is in stoichiometric excess. However, small excesses of sodium silicate are not objectionable. Thus, it is possible to use sodium silicate 10 to 25 percent in excess of the calcium chloride although best results are obtained when the calcium chloride is at least in stoichiometric amount. Excesses of sodium silicate as high as 100 percent over stoichiometric usually give unsatisfactory products. However, even such amounts may be used if the sodium chloride concentration is sufficiently high and the rate of acidification is held within the proper limits. Thus, the adverse effects of excess sodium silicate may be counteracted to an appreciable degree by the presence of sodium chloride in the reaction mixture subjected to acidification.

The precipitation of calcium or other alkaline earth metal silicate in finely divided state, such as is herein required, may be accomplished with best results by mixing a stream of aqueous sodium silicate solution with the calcium chloride solution under conditions which subject the mixture to a high degree of turbulence and almost instantaneous mixing. The amount of reactants in the respective streams is proportioned so as to obtain calcium silicate in the desired concentration and to establish an excess of calcium chloride over the stoichiometric quantity required to react with the silicate. One effective way to produce the required turbulence is to introduce the two streams closely together into a central area of a centrifugal pump. In this case, the agitation of the mixture is effected as the introduced streams of the reactants are thrown radially outward by the pump rotor. In most cases, it is found desirable to limit the feed of the calcium chloride solution and alkaline metal silicate solutions to the pump to an amount below the capacity of the pump. For example, if the pump is capable of discharging 100 gallons per minute with unlimited flow of liquid to the pump, the amount of reacting solution supplied to the pump is held at least 10 percent below, and usually 35 percent or more below this amount. This appears to afford a greater degree of agitation of the reacting solutions and to ensure production of calcium silicate having the desired fineness.

To ensure production of the calcium silicate in a highly finely divided state, alkaline metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is as defined above. However, other calcium silicate, where $x$ is higher, may be used in certain cases.

The resulting silica is a dry powder which is found to be in an extremely fine state of division and is preponderantly silica. By analysis the dried product normally contains above 75 percent $SiO_2$, the usual range being about 78 to 88 percent $SiO_2$. On the anhydrous basis the silica concentration of the product is above 90 percent, usually being in excess of about 95 percent. The surface area of this product ranges between 75 and 125 square meters per gram, as measured by the Brunauer-Emmett-Teller method of determining surface area.

The pigment contains approximately 10 to 15 percent water. The free water content normally ranges between 2 to 10 percent, the balance being bound water.

The pigment prepared according to this method normally contains an appreciable concentration of calcium. This calcium content usually ranges between ½ to 6 percent, computed as calcium oxide. Because of this calcium content, the pH of the pigment is stabilized on the alkaline side. Other impurities, frequently in the range of 0.1 to 2 percent, such as iron and aluminum oxides, sodium chloride, and carbon dioxide, usually are present.

The following are typical analyses of silica samples made from various runs in which calcium silicate prepared as described above is reacted with hydrochloric acid as above described:

TABLE I

| Sample No. | Percent $SiO_2$ | Percent $R_2O_3$ (Aluminum and iron oxide) | Percent CaO | Percent Cl | Percent $H_2O$ |
|---|---|---|---|---|---|
| 1 | 82.3 | 1.30 | 1.40 | 0.21 | 15 |
| 2 | 86.5 | 0.73 | 1.18 | | 11.6 |
| 3 | 79.77 | 1.16 | 2.54 | 0.89 | 15.6 |
| 4 | 79.9 | 2.2 | 3.0 | 0.37 | 14.5 |
| 5 | 83.99 | 0.80 | 1.31 | 0.47 | 14.4 |

Percentages in the above table are by weight.

The acid used to effect the neutralization or decomposition of calcium silicate normally is hydrochloric acid. On the other hand, other acids which form water soluble anions with calcium may be used. Such acids include hypochlorous acid, hydrobromic acid, nitric acid, nitrous acid, and acetic acid. The following is an example of this process:

*Example I*

Streams of aqueous sodium silicate solution containing 100 grams per liter of $SiO_2$ as $Na_2O(SiO_2)_{3.36}$, and calcium chloride solution containing 100 grams per liter of $CaCl_2$ and 30 to 40 grams per liter of sodium chloride, were fed directly into the central area of a centrifugal pump at 150° F.

The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5 The precipitated silica was recovered by decantation and filtration, and was dried in an oven at a drying temperature of 120 to 140° C. for 12 hours. The free water content of the product was within the range of 3 to 8 percent by weight of the pigment.

It will be noted that the silica pigments may be prepared from materials other than calcium silicate. Thus, finely divided, precipitated magnesium silicate, barium silicate or strontium silicate, as well as silicates of zinc and other metals of series 3 to 8, group II of the periodic table, which have the surface area properties roughtly approximating those set forth with respect to calcium silicate, may be subjected to treatment with water soluble acids according to this invention in order to extract the metals and produce the herein contemplated pigment. In such a case, the magnesium or like silicate preferably is prepared as described above by reaction of metal chloride solution containing at least 0.1 pound of sodium chloride per pound of metal chloride.

The surface area of the resulting silica is determined by the pH of the slurry from which it is recovered. Thus, if sufficient acid is added to the calcium silicate to reduce the pH to as low as 2, for example, the silica which is thus obtained has an unusually high surface area. Such a pigment, if recovered from such slurry, would not be suitable for the applicant's purpose. On the other hand, when this slurry is treated with alkali to increase the pH to above 5, the surface area reduces as the pH increases, so that when the pH is 5 or above, the surface area has fallen to approximately 135.

The following example illustrates this principle:

*Example II*

Eight liters of calcium silicate slurry containing 100 grams per liter of calcium silicate, and prepared according to the method described in Example I, was placed in a 12-liter flask fitted with a stirrer. The slurry was heated to 70° C. while being stirred, and then hydrochloric acid solution having a strength of 3.5 normal was added at a rate of 100 milliliters per minute for 12½ minutes. Fifteen minutes after all the acid was added, 3.5 normal sodium hydroxide solution was added to the slurry, with agitation, at a rate of 100 milliliters per minute for 11 minutes. During the addition of the hydrochloric acid and the sodium hydroxide, 100 milliliters of samples of slurry were withdrawn at the time intervals indicated in the table below, and placed in 4-ounce sample bottles which were then closed. These samples were allowed to stand for 3 days. Thereafter, the pH of the slurry samples was measured and the slurries filtered on a 100-milliliter Buchner funnel. The time was noted when the filter cake lost its shine prior to cracking. This time interval was taken as the filtration time.

Following filtration of the slurry, the filter cake was washed with distilled water until free of chloride ions. The washed pigment samples were then dried in an oven at 105° C., ground in a mortar, and the surface area of the samples was measured.

The results obtained are summarized in the following table:

TABLE II

| Time Minutes | Slurry pH | Filtration time (Minutes and Seconds) | Surface Area of product (Square meters per gram) |
|---|---|---|---|
| 0 | 9.14 | 2' 23" | 93.4 |
| 1 | 8.98 | 2' 53" | 92.7 |
| 2 | 8.93 | 2' 30" | 96.0 |
| 4 | 8.83 | 2' 28" | 99.3 |
| 6 | 8.72 | 2' 28" | 105.5 |
| 8 | 8.56 | 3' 4" | 113.7 |
| 8.5 | 8.51 | 3' 35" | 119.8 |
| 9 | 8.46 | 2' 41" | 123.2 |
| 9.5 | 8.35 | 2' 48" | 124.4 |
| 10 | 8.20 | 2' 53" | 133.2 |
| 10.5 | 8.10 | 3' 23" | 132.5 |
| 11 | 7.80 | 2' 54" | 130.5 |
| 11.5 | 7.33 | 2' 52" | 135.5 |
| 12 | 6.68 | 3' 30" | 165.0 |
| 12.5 | 2.41 | 12' 35" | 506 |

15 minutes elapsed time

| | | | |
|---|---|---|---|
| 0 | 2.30 | 8' 0" | 507 |
| .5 | 7.00 | 2' 51" | 138.2 |
| 1 | 7.57 | 3' 23" | 130.4 |
| 1.5 | 7.91 | 3' 31" | 123.7 |
| 2 | 8.15 | 3' 18" | 126.2 |
| 2.5 | 8.29 | 3' 4" | 120.0 |
| 3 | 8.47 | 2' 55" | 120.7 |
| 3.5 | 8.58 | 2' 50" | 110.6 |
| 4 | 8.76 | 2' 52" | 105.2 |
| 4.5 | 8.88 | 2' 40" | 99.6 |
| 5 | 8.97 | 2' 26" | 99.7 |
| 6 | 9.09 | 2' 21" | 116.7 |
| 8 | 9.14 | 2' 5" | 138.2 |
| 10 | 9.22 | 1' 52" | 186.3 |
| 11 | 9.28 | 52" | 208.5 |

In the above tests, it will be noted that the pH of the slurry and not of the dried pigment was obtained. In general, it is found that when the dried pigment is slurried in water, the pH thereof is somewhat higher than that of the initial slurry. With slurries having a pH above about 8, this difference is only minor. On the other hand, with slurries having a pH below 8, the pH of the dry pigment, when reslurried, usually is as much as 1 or 2 pH units above that of the pH of the initial slurry.

The above tests clearly indicate the effect of the pH upon the filtering characteristics and also the surface area of the ultimate product. Thus, it is usually desirable to effect the reaction under conditions such that the pH of the slurry prior to filtration is in excess of 5 and, to achieve maximum dispersion in rubber, the slurry pH should be between about 5 and 7.

The pigments contemplated within the scope of the present invention may be prepared by other methods. For example, the calcium silicate prepared as described above, and/or having the properties described above, may be reacted with an aqueous solution of ammonium chloride. In such a case, the ammonium chloride reacts with the calcium silicate, liberating ammonia and precipitating silica. The reaction proceeds according to the following equation:

$$2NH_4Cl + CaO \cdot (SiO_2)_x \rightarrow CaCl_2 + 2NH_3 + xSiO_2 + H_2O$$

The reaction of calcium silicate with ammonium chloride may be effected by adding the ammonium chloride, usually as an aqueous solution, to an aqueous slurry of the calcium silicate. During this addition, the slurry is generally agitated and, ultimately, the slurry is heated to drive off the ammonia. Usually, this heating is continued until all or substantially all of the free ammonia has been driven off. Sufficient ammonia is used to ensure decomposition of substantially all of the calcium silicate.

Advantageously, the ammonium chloride solution should contain an appreciable amount of ammonia and sodium chloride. Silica which has especially valuable properties has been prepared using such a solution. The ammonia serves, among other purposes, to maintain the pH of the slurry within a range at which a readily filterable slurry is obtained. The amount of ammonia and sodium chloride which may be present is capable of considerable variation. Solutions containing in excess of 5, and usually ranging from 5 to 50 grams per liter of free ammonia, are found to be suitable. The sodium chloride content of solutions used according to this invention normally exceeds 25 grams per liter of solution, usually being in the range of 50 to 100 grams of NaCl per liter of solution.

After reaction of the calcium silicate with the ammonium chloride is completed and the resulting free ammonia has been removed, the resulting slurry is treated to recover the pigment suspended therein. This may be done effectively by conventional decantation and/or filtration operations. In the course of this operation, water soluble salts, such as calcium chloride, ammonium chloride, etc., are washed from the pigment and the resulting product is dried at a suitable temperature.

Some improvement in pigment properties of silica produced by reaction of calcium silicate with ammonium chloride is obtained when the resulting silica is subjected to the reaction of acid after removal of ammonia is essentially complete. These acids should be capable of forming water soluble compounds with calcium. Typical acids suitable for use are hydrochloric, nitric, acetic, and like acids. Such treatment removes a portion or all of residual calcium, magnesium, iron, aluminum, and other impurities, and thus ensures production of a purer product. Following this acid treatment, it frequently will be advantageous to neutralize excess acidity and to ensure production of a pigment having a pH above 5. The following examples are illustrative:

*Example III*

An aqueous solution of sodium silicate was prepared by diluting 5.88 liters of sodium silicate containing 298 grams per liter of $SiO_2$ as sodium silicate having the composition Na₂O(SiO₂)₃.₃₆, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| SiO₂ | 77.84 |
| R₂O₃ (iron and aluminum) | 1.30 |
| CaO | 5.88 |
| MgO | 1.36 |

*Example IV*

47.1 liters of sodium silicate solution containing 298 grams per liter of SiO₂ as Na₂O·(SiO₂)₃.₃₆ was diluted to 145 gallons. 87.5 gallons of an aqueous solution containing 10,650 grams of calcium chloride and 2,800 grams of sodium chloride was made up. These solutions were mixed with vigorous agitation as in Example III. The slurry precipitate was washed to remove dissolved chlorides, and an aqueous slurry containing 42.7 grams of calcium silicate per liter of slurry was obtained. Fifty gallons of this calcium silicate slurry was mixed with 23.19 liters of aqueous ammonium chloride solution prepared from the preparation of soda ash according to the Solvay process by reaction of sodium chloride, ammonia, and carbon dioxide, in aqueous solution. This solution contained 160 grams per liter of NH₄Cl and about 20 grams per liter of free ammonia, together with about 70 grams per liter of NaCl.

The resulting mixture was heated to boiling until no further ammonia was given off. Thereafter, the precipitate was filtered, washed, dried, and pulverized. The resulting product is preponderantly SiO₂ and is a useful rubber pigment. It was compounded with a GR–S composition according to the following formula:

| | Percent by weight |
|---|---|
| GR–S | 100 |
| Zinc oxide | 5 |
| Sulphur | 3 |
| n-Cyclohexyl 2-benzothiazol sulphenamide | 1 |
| Processing oil | 5 |
| Phenyl beta naphthyl amine | 1 |
| Silica as prepared above | 68.2 |

*Example V*

Calcium silicate slurry was prepared according to the process generally described in Example I, using an aqueous solution of sodium silicate containing 100 grams per liter of SiO₂ as Na₂O(SiO₂)₃.₃₆, and calcium chloride solution containing 100 grams per liter of CaCl₂ and 30 to 40 grams per liter of NaCl at a temperature of 150° F. The resulting slurry of calcium silicate contained 0.35 gram equivalents per liter of alkalinity, as determined by titration with HCl to methyl orange end point.

One hundred gallons of this calcium silicate slurry was placed in a tank and mixed with 20 gallons of ammonium chloride solution containing 1.95 gram equivalents of NH₄Cl per liter of solution as well as 15 grams per liter of free ammonia and 70 grams per liter of NaCl.

The resulting slurry was heated by passing the slurry in countercurrent contact with steam in a 6-inch glass-lined steel column packed to a depth of 18 feet with ½-inch Berl saddles. In this operation, the slurry was fed to the top of the column at a rate of 50 pounds per hour, ammonia being withdrawn from the top of the column. The resulting slurry had a pH of 7.6.

After filtration and drying at a temperature of about 100 to 120° C., the product had the following composition:

| | Percent by weight |
|---|---|
| Chloride | 1.47 |
| Free H₂O | 10.45 |
| Ignition loss | 12.49 |
| CaO | 1.85 |
| SiO₂ | Balance |
| pH | 8.2 |

This product is an effective rubber reinforcing pigment.

*Example VI*

Twelve gallons of silica slurry prepared as described in Example V, after the steam treatment, was mixed with 200 cubic centimeters of an aqueous solution of hydrochloric acid containing 32 percent by weight of HCl. The resulting mixture was allowed to digest at a temperature of 30° C. for 16 hours. Thereafter, the slurry was filtered and the resulting silica dried. This product, when incorporated in rubber according to standard methods, yielded results which were superior to those obtained using silica prepared according to Example V.

It will be understood that silica pigments which come within the purview of this invention can be prepared by other processes. For example, silica can be precipitated by reaction of ammonium chloride with sodium silicate under specific conditions which are controlled and adjusted so as to produce a pigment of the character herein contemplated. Moreover, sodium silicate may be reacted with acids, notably carbonic acid, in order to produce a pigment of the type herein contemplated. The following examples are illustrative:

*Example VII*

A 30-gallon, open-top barrel, provided with an agitator consisting of a vertical shaft driven by a ¼ hp. motor and having three 3-inch propellers, was charged with 48 liters of an aqueous solution of sodium silicate,

Na₂O(SiO₂)₃.₃₆ containing 20.3 grams per liter of Na₂O, about 68 grams per liter of SiO₂, and 10 grams per liter of sodium chloride. Carbon dioxide gas, diluted with air to such an extent that the diluted gas had a CO₂ concentration of about 10 percent by volume, was introduced into the drum through a stainless steel tube with the discharge end of the tube being located below the bottom of the agitator. The rate of introduction of gas was adjusted so that just the theoretical amount of carbon dioxide required to produce sodium carbonate was introduced into the solution in 24 hours. This carbonation rate was held substantially constant over the carbonation period. The temperature was maintained at 35° C. during carbonation and the mixture continuously agitated.

After the theoretical amount of carbon dioxide (the amount of carbon dioxide sufficient to react with the sodium carbonate and to convert all the Na₂O content thereof to sodium silicate) had been introduced, the mixture was heated by direct introduction of steam from a 140-pound steam line to maintain the temperature of the slurry at boiling temperature for a period of about 2 hours. The heated slurry was then filtered and the dewatered silica dried in an oven at a temperature of 108° C., after which it was micropulverized.

The surface area of the resulting finely divided silica was determined by the standard low temperature nitrogen adsorption method proposed by Brunauer, Emmett, and Teller, and was found to be 149 square meters per gram.

The silica pigment as thus produced was incorporated by conventional compounding methods in the following GR-S rubber recipe:

| | Parts by weight |
|---|---|
| GR-S | 100.0 |
| Zinc oxide | 5.0 |
| Sulphur | 3.0 |
| Agerite powder (phenyl beta-naphthylamine) | 1.0 |
| Altax (dibenzothiazyl disulfide) | 1.2 |
| Methyl Tuads (tetramethyl thiuram disulfide) | 0.15 |
| Picco 100 (cumarone indene resin) | 15.0 |
| Diethylene glycol | 10.0 |
| Silica pigment | 58.5 |

The resulting rubber composition was subjected to various curing times at 280° F. and then tested for tensile strength and tear strength. It was found that the tensile strength of the vulcanized rubber, after curing for 20 minutes at 280° F., was 2440 p. s. i., and the tear strength was 250 pounds per inch thickness.

In the preparation of the pigment under the above conditions, the presence of the soluble salt is important. Silica formed under the same conditions but with smaller amounts of sodium chloride was inferior as a rubber pigment, and when the sodium chloride was omitted, the precipitated silica gelled and was discarded.

*Example VIII*

Twenty-six hundred gallons of sodium silicate solution containing 18 grams per liter of NaCl and 20 grams per liter of $Na_2O$ as the sodium silicate, $Na_2O(SiO_2)_{3.3}$, was placed in a 4000-gallon tank. Carbon dioxide gas containing 10 percent by volume of $CO_2$, the balance being nitrogen, was introduced into the solution over a period of 3 hours while holding the solution at 30° C. at a rate sufficient to react with all of the sodium silicate and convert 20 to 25 percent of the $Na_2O$ content thereof to bicarbonate. Thereafter, the resulting slurry was boiled for one hour, filtered, and washed. The filter cake was reslurried and a solution of $Al_2(SO_4)_3 18H_2O$ in quantity sufficient to introduce into the slurry ½ percent of Al, based upon the weight of the $SiO_2$ in the slurry, was added to the slurry. Thereafter, the slurry was stirred briefly and enough hydrochloric acid was added to adjust the pH to 5.7. The resulting slurry was filtered and the filter cake dried.

*Example IX*

A 90-liter autoclave kettle provided with a heating and cooling coil, an agitator, and a metal thermometer, was charged with 48 liters of a solution containing 20 grams per liter of sodium chloride and a quantity of sodium silicate sufficient to cause the solution to contain 20.3 grams per liter of $Na_2O$ and about 68 grams per liter of $SiO_2$. Essentially pure carbon dioxide was introduced through the bottom of the kettle under the liquid level of the solution at a point about 1 inch below the center of the agitator. The temperature was maintained at 25° C. during carbonation.

The carbon dioxide was fed to the solution at such a rate as to deliver the theoretical amount of carbon dioxide thereto in 4 hours and carbonation was continued at this rate for 5 hours, thus providing a 25 percent excess of $CO_2$ over that theoretically required to produce the carbonate.

After 5 hours of carbonation, a sample of the slurry (designated sample A in the table below) was taken out, the pigment filtered, washed twice with water, reslurried, and the pH of the slurry adjusted to 7.3 with hydrochloric acid. Thereafter, the pigment was washed until the filtrate was substantially chloride-free.

The slurry remaining in the kettle was boiled for 1 hour and two samples of the boiled slurry removed from the kettle. One of these samples (designated sample B in the table below) was washed with water alone while the other (sample C) was reslurried and the pH of the slurry adjusted to 7.2 with hydrochloric acid. The acidified pigment was then washed substantially chloride-free with water.

The slurry remaining in the kettle was maintained under a carbon dioxide atmosphere with agitation for an additional 2 hours. The carbon dioxide pressure was maintained from about 2 to 5 pounds per square inch gauge. This treatment of the slurry with carbon dioxide under pressure reduced the pH of the slurry somewhat. A sample of the thus treated slurry (sample D) was recovered by filtration and washed with tap water.

All of the samples A to D were dried at 105° C. in a forced-draft laboratory oven, were micropulverized, and then compounded in rubber in accordance with the procedure of Example VII, after which the tensile and tear strengths of the samples were determined. Table III below lists the surface areas of the different samples before incorporation in the rubber, and the tensile and tear strengths of the rubber compositions in which the respective samples were incorporated.

TABLE III

| Sample No. | Surface Area (square meters per gram) | Tensile Strength (pounds per square inch) | Tear Strength (pounds per inch) |
|---|---|---|---|
| A | 337 | 3,110 | 280 |
| B | 122 | 3,120 | 330 |
| C | 138 | 3,220 | 400 |
| D | 127 | 3,550 | 320 |

*Example X*

A 4000-gallon rubber-lined tank equipped with a motor-driven turboagitator was charged with a 2700-gallon batch of silicate-salt solution prepared by adding hot concentrated sodium silicate to brine in the ratio of 1:4. The sodium silicate solution was adjusted to contain 20.3 grams per liter of $Na_2O$ and 17.4 grams per liter of NaCl. The solution, after mixing, was brought to a temperature of 30° C. by heating with live steam, and was then carbonated by bubbling therethrough a gas containing 40 percent $CO_2$ to precipitate silica. The gas was introduced through a 2-inch pipe into the bottom of the tank and entered the solution at a point just under the agitator propeller. The carbonation rate was such as to introduce the theoretical amount of $CO_2$ in 3.5 hours. Agitation of the solution was continued during carbonation.

At the end of 4.5 hours of carbonation, the batch was heated to boiling by injection of live steam. The heating rate was such as to increase the temperature of the solution about 1° C. per minute, and, when the boiling point had been reached, the solution was boiled for one hour. During heating and boiling, the gas was added at a reduced rate.

After standing overnight, the resulting slurry was pumped to a 3-foot by 3-foot wash wheel where the slurry was filtered and the cake washed to remove salt and alkali. The slurry fed to the wash wheel was kept hot by steam-heated coils, and hot condensate was used as wash water. The washed filter cake was reslurried, then again filtered, then reslurried and returned to the precipitation tank where the alkali therein was neutralized with 10 N HCl to reduce the $Na_2O$ content to 0.5 gram per liter. The salt content of the neutralized slurry was 4.0 grams NaCl per liter, and the pH was 7.2. The slurry contained 0.43 pound per gallon of solids.

The slurry was then pumped to a 2-foot by 4-foot diameter vacuum filter wheel and filtered. The filter cake from this wheel was charged to a 3-foot by 25-foot steam-heated rotary drier and dried to a moisture content of 4 percent to 6 percent, after which the dried material was pulverized in a No. 1 micropulverizer. The silica pigment as thus prepared was incorporated in a GR-S rubber formula as follows:

|                                                        | Parts by weight |
| ------------------------------------------------------ | --------------- |
| GR–S                                                   | 100.0           |
| Zinc oxide                                             | 5.0             |
| Sulphur                                                | 3.0             |
| Agerite powder (phenyl beta-naphthylamine)             | 1.0             |
| Altax (dibenzothiazyl disulfide)                       | 1.2             |
| Methyl Tuads (tetramethyl thiuram disulfide)           | 0.05            |
| Picco 100 (cumarone indene resin)                      | 15.0            |
| Glycol                                                 | 3.5             |
| Silica pigment                                         | 58.5            |

A rubber sample as thus compounded was cured for 20 minutes at 280° F., and gave a tensile strength of 3280 pounds per square inch and a tear strength of 250 pounds per inch.

*Example XI*

A 90-liter autoclave kettle provided with a heating and cooling coil, an agitator, and a metal thermometer, was charged with 12,850 grams of sodium silicate solution containing 976 grams of $Na_2O$ and 3,115 grams of $SiO_2$. The solution was diluted to 48 liters total volume and the temperature raised to 95° C. The solution was carbonated with 100 percent $CO_2$ and a carbonation rate was used such as to introduce the theoretical amount of $CO_2$ in about 30 minutes. Carbonation was continued at this rate for about 1 hour, at the end of which time the pH of the slurry was 9.85.

The resulting slurry was filtered and washed twice with hot tap water. The filter cake was reslurried and adjusted to a pH of 6.75 by adding 400 cubic centimeters of 3.5 N HCl thereto. The acidified slurry was then filtered and the filter cake washed nearly chloride-free with hot tap water, after which the precipitate was dried at 105° C. in a forced-draft laboratory oven, then micropulverized, air-conditioned, analyzed, and compounded in rubber as previously described. The finished pigment had a pH of 8.2 and contained 0.61 percent sodium. Its B. E. T. surface area was 148 square meters per gram. A vulcanized rubber sample incorporating the pigment exhibited a tensile strength of 2710 pounds per square inch and a tear strength of 260 pounds per inch.

*Example XII*

A series of experiments was performed in which silica was precipitated with ammonium chloride in a 30-gallon, rubber-lined, open-top barrel provided wtih three 3-inch propellers on the shaft of a ¼ H. P. laboratory stirrer. Where necessary, the solutions were heated by direct steam from a 140 pounds per square inch steam line.

In the performance of these tests, sodium chloride was first dissolved in water and then sodium silicate, having the composition $Na_2O(SiO_2)_{3.36}$, was added. The amount of $Na_2O$ in the sodium silicate was maintained constant at 488 grams. The $SiO_2$ content of the solution was approximately 1640 grams, with very slight variation. The mixture was brought to the desired reaction temperature and the total volume of the solution was made up by dilution with water to 48 liters. The concentration of the $Na_2O$, therefore, was 10.15 grams per liter, and the $SiO_2$ concentration was about 33.8 to 34.3 grams per liter in all experiments. After a waiting period of about 30 minutes, the ammonium chloride solution was added.

This ammonium chloride solution contained the following approximate composition:

|                                                            | Grams per liter |
| ---------------------------------------------------------- | --------------- |
| Free ammonia as $NH_3$                                     | 17.5            |
| Fixed ammonia in ammonium chloride computed as $NH_3$      | 56.1            |
| Total chlorine                                             | 160.2           |
| Fixed ammonia calculated as ammonium chloride              | 176.1           |
| Sodium chloride                                            | 71.8            |

The pH of this solution was approximately 10.3.

The above analysis of the ammonium chloride solution is approximate and slight variations occurred over the range of experiments, usually not in excess of about plus or minus 3 or 4 percent.

In the performance of the process, the sodium chloride-sodium silicate solution was allowed to stand for 30 minutes and thereupon the ammonium chloride solution was added in amount equal to 108 percent of the equivalent of the $Na_2O$, i. e., 910 grams of $NH_4Cl$. The ammonium chloride solution was added by means of a variable speed metering pump. Following the addition, the resulting slurry was brought to boiling within about 5 minutes by direct heating with steam. This heating was continued and ammonia distilled from the slurry until the alkalinity of the raw slurry had only a slight phenolphthalein reaction. The heating period varied between 60 and 90 minutes. The hot slurry was then filtered and the filter cake was washed free from chloride ion with cold water. In the first washing, about 400 cc. of 3.5 N hydrochloric acid was used. Thereafter, the filter cake was washed free from chloride ion with water. The hydrochloric acid treatment had the effect of eliminating all remaining alkali, and therefore all of the finished product had a pH between 4 and 6.5. The filter cakes were dried at 110° C., the pigment micropulverized, and the surface area of the various pigments was measured, being found to range between 70 to 200 square meters per gram.

*Example XIII*

In each of a series of large-scale experiments, a sodium silicate solution having the composition $Na_2O(SiO_2)_{3.36}$, and containing the amount of sodium silicate equivalent to the $Na_2O$ content set forth in the following table, was placed in a 4000-gallon tank. The NaCl content and temperature of the solution were as stated in the table.

Ammonium chloride solution containing about 44.8 grams per liter of fixed $NH_3$ as $NH_4Cl$, 73.9 grams per liter of NaCl, and 16.2 grams per liter of free $NH_3$ was added (with vigorous agitation, using a 25 hp. turbo-agitator) while maintaining the temperature of the mixture substantially constant. After precipitation, the slurry was heated to about 90–100° C. in a still to drive off evolved $NH_3$, and thereafter the suspension was allowed to condition for at least ½ hour at a temperature above 75° C. Following this, the slurry was filtered and the resulting product was recovered, dried at about 110–125° C. in a rotary drier, and incorporated in a GR–S rubber composition for testing according to standard methods.

The results are as follows:

TABLE IV

| Experiment No. | Amount of Ammonium Chloride Solution added (Gallons) | Final pH of pigment | NaCl Content of Sodium Silicate Solution (grams per liter) | $Na_2O$ Content of Sodium Silicate Solution (grams per liter) | Silicate Solution (Gallons) | Temp., ° C. | Time of Addition (Minutes) | Surface Area of Product, Square Meters per gram |
| --- | --- | --- | --- | --- | --- | --- | --- | --- |
| 1 | 690 | 7.6 | 0    | 20.1 | 2,700 | 33 | 1,440  | 114 |
| 2 | 730 | 8.3 | 20   | 20.3 | 2,890 | 27 | 20     | 144 |
| 3 | 468 | 6.1 | 20.6 | 19.9 | 1,850 | 25 | 20     | 167 |
| 4 | 500 | 7.7 | 5.78 | 20.1 | 2,075 | 25 | 240    | 148 |
| 5 | 585 | 7.4 | 9.85 | 20.5 | 2,165 | 25 | 120    | 143 |
| 6 | 700 | 7.2 | 3.05 | 20.2 | 2,675 | 25 | ¹ 210  | 143 |

¹ In this test, ½ of the amount of ammonium chloride required was added in 3½ hours. The balance was added rapidly within about 15 minutes.

As shown by the above disclosure, the recovery of silica from an aqueous slurry formed by acidification of a solution or slurry of a metal silicate to solubilize the metal produces a slurry having a pH below 5. Adjustment of the slurry pH above 5 enables rapid settling and/or filtration of the slurry.

Silica prepared according to this invention has a bulk density of about 5 to 10 pounds per cubic foot. When milled into a rubber composition, some dusting tends to occur.

According to a further embodiment of this invention, this dusting may be avoided by compacting the silica into cakes of convenient size and increased bulk density. Thus, it has been found that this silica may be compressed to a bulk density of about 15 to 30 pounds, preferably 20 to 25 pounds, per cubic foot, by compacting the silica under a pressure of about 125 to 200 pounds per square inch. Compacting to a bulk density above about 30 pounds per cubic foot is objectionable because the product becomes difficult to mill into rubber without pre-grinding.

This compressing may be effected simply by pouring the silica into a mold and applying pressure to the silica in a mold, thus producing a bonded cake of any convenient volume, for example, one or more cubic feet. The free water in the cake probably aids to facilitate the bonding of the particles under the applied pressure.

Example XIV

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F.±0.5°. Carbon dioxide gas containing 10.0 to 10.8 percent of $CO_2$, the balance being nitrogen and air, is introduced into the solution at a gas temperature of 115 to 145° F. at a rate sufficient to provide 1250 cubic feet of the carbon dioxide gas per minute (measured at 760 millimeters pressure and 0° C.). This gas is introduced directly under a turboagitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then washed and the silica is recovered. The silica has a surface area of 140 to 150 square meters per gram.

Although the present invention has been described with reference to the specific details of such an embodiment, it is not intended that such details shall be regarded as limiting the scope of the present invention except insofar as such limitations appear in the accompanying claims.

This application is a continuation-in-part of my co-pending application Serial No. 63,205, filed December 2, 1948 (now abandoned), and is a division of my copending application Serial No. 283,721, filed April 22, 1952.

What is claimed:

1. Vulcanized composition containing a rubber of the group consisting of natural rubber and synthetic rubbery polymers of conjugated dienes and having dispersed therein from about 5 to 100 parts by weight of a finely divided silica pigment to about 100 parts by weight of said rubber, said finely divided silica pigment containing at least 90 percent by weight of $SiO_2$ measured on the anhydrous basis, bound water in the proportion of one mole of water per 3 to 9 moles of $SiO_2$, the free water content of said pigment being up to 10 percent by weight; said pigment being in the form of porous flocs and having a surface area of 60 to 200 square meters per gram and an average ultimate particle size of 0.015 to 0.05 micron.

2. The rubber of claim 1 in which the amount of said pigment is 40 to 80 parts by weight per 100 parts by weight of rubber.

3. The product of claim 1 wherein the rubber is a rubbery butadiene-styrene copolymer rubber.

4. The product of claim 1 wherein the rubber is natural rubber.

5. The product of claim 1 wherein the rubber is a butadiene-acrylonitrile copolymer.

6. The product of claim 1 wherein the $Na_2O$ content of the pigment does not exceed about 1.75 percent.

No references cited.